United States Patent Office 3,287,145
Patented Nov. 22, 1966

3,287,145
CHEMICAL ADMIXTURE FOR HYDRAULIC
CEMENTITIOUS MIXTURES
Herman Christian Fischer, Neshanic Station, N.J., assignor, by mesne assignments, to Union Carbide Corporation, New York, N.Y., a corporation of New York
No Drawing. Filed Aug. 10, 1965, Ser. No. 478,756
18 Claims. (Cl. 106—90)

This application is a continuation-in-part of U.S. Letters Patent application Serial No. 200,650, filed June 7, 1962, and now abandoned. The invention relates to chemical admixture compositions for incorporation in hydraulic cementitious mixtures such as grouts, mortars, and concretes. The instant invention is particularly related to cementitious compositions requiring a reduced amount of mixing water and improved setting and hardening properties as compared to present compositions. Precast hydraulic cement products such as blocks, slabs, panels, and special shapes are to be considered within the scope of this invention. While primarily applicable to cast-in-place mixes such as are the majority of cases in concrete construction, this invention is not restricted to such and is useful in additional applications.

Hydraulic cementitious mixtures may be defined as mixtures comprising a hydraulic cement, aggregate and water, having the property of setting to a hardened mass. Such mixtures may contain Portland cement and may contain mineral or non-mineral aggregates or mixtures thereof.

The principal properties of hydraulic cementitious mixtures in the plastic state, prior to setting, are those of workability, consistency, bleeding rate and capacity, and setting time, whereas the principal properties of hardened hydraulic cementitious mixtures lie in the general categories of strength, durability, dimensional stability, and impermeability. The advantageous use of chemical admixtures to modify these various properties of hydraulic cementitious mixtures, in both plastic and hardened states, has come to be well known. Such modifications are for the purpose of making the cementitious mixtures more suitable for the particular job requirements. In consideration of the properties of hydraulic cementitious mixtures and the manner of improvement by the use of additives and particularly by the additive of this invention, the following discussion is beneficial.

The term workability is difficult to define in a precise manner; however, it may be considered as a property exhibited by a mass or body of material which is capable of being subjected to maximum deformation without ensuing segregation. Surface-active agents of various types have been shown to improve working qualities.

Another property of plastic mixes of hydraulic cementitious materials, and of considerable interest in construction, is that known as bleeding. Bleeding or water gain, whereby mix water collects at the horizontal surface of an in-place mix, is the result of paste and aggregate settlement. Complete lack of bleeding can be undesirable insofar as such makes surface finishing more difficult because of the absence of a lubricating film of water. The reduction of mix-water content through bleeding has been considered beneficial by virtue of cement paste strengthening. Excessive bleeding, however, is detrimental to the homogeneity of a mix in that fissure formation and channeling occur with concomitant loss of strength and increased permeability of the final product.

Water reduction and air-entrainment have been shown to alleviate bleeding problems which arise because of physical characteristics of cementing materials and improper mix proportioning or design. Water reduction is remedial in that bleeding is known to be a function of the amount of water in excess of a certain base quantity which, in turn, is a function of materials and proportioning. Heretofore, attempts have been made to decrease the amount of mixing water necessary by adding at least one of a class of materials termed water-reducing agents. The purpose or theory for the addition of such agents is to promote with the cement composition improved compressive and flexural strength properties. Illustrative of such materials have been aliphatic and aromatic hydroxy acids, their salts and their esters. With the addition of such materials, however, it has been found that whereas they affect certain properties, further needed benefits necessitate the addition of still further ingredients and particularly air-entraining agents.

By air-entrainment, it is meant the purposeful inclusion of discrete bubbles of air of optimum size and distribution which alter the process of settlement and water gain and particularly the rate of such. The bleeding capacity or total amount of bled water is generally unaffected although, because of reduced bleeding rate and subsequent arrest of bleeding by actual setting of the cementitious material, there is some decrease in quantity. As air-entraining agents, there have been added various compounds and mixtures which, in general, are of a surface-active nature. Alkaline solutions of various natural resins obtained from fir or pine trees, condensation products of the phenol-formaldehyde type, soluble alkali salts of alkyl, aryl, and alkyl aryl sulfates and sulfonates are illustrative of common air-entraining agents. However, none of these provide fully satisfactory results.

Previous attempts at solving the above-described problems have been to add a combination of water-reducing agents and an air-entraining agent in an attempt to achieve the beneficial properties of each with an effort to minimize any disadvantages. One of the previous attempts at obtaining control over the above-discussed properties is represented by British Patent No. 799,071, wherein a suitable air-entraining agent, a resinate, was combined with a surface-active agent such as a polyoxyalkylene condensation product of a fatty acid.

Another very important property of hydraulic cement mixes is that of setting time or hardening. Unless retardation of set is desired for specific purposes, such phenomenon can give rise to problems in construction. Many of these problems are of an economic nature since they involve such considerations as delayed and excessive finishing time, low turnover of forms for further use because of inadequate early strength-stripping requirements, and general rescheduling of connected work.

In consideration of a combination of bleeding and retardation, a problem arises which is of serious consequence not only as a matter of economics, but also because of the possibility of impairment of final product surface. This problem may be referred to as delayed bleeding. If a mix bleeds copiously and also for an excessive period of time, without being arrested by setting of the cementitious material, serious surface defects can occur in the hardened state. Such defects are exhibited as cracking, crazing, and scaling off. Not only is the aesthetic value of the surface impaired, but the actual durability of the integral unit becomes questionable.

It is of noteworthy importance therefore that this invention, a chemical admixture for hydraulic cement mixes, not only has desirable effects on bleeding characteristics, but also does not cause any significant inherent retardation of set or decreased rate of hardening properties and is accomplished without the necessity of combining both water-reducing agents and air-entraining agents.

It is therefore an object of the instant invention to provide a chemical additive for cementitious compositions which will improve upon the previously described properties.

It is a further object of this invention to improve the workability and decrease the water requirement for hydraulic cementitious mixtures by incorporating therein a chemical additive which will favorably affect the properties of the final product, viz, hardened mass, with regard to homogeneity, strength, weather resistance and other characteristics.

A further object of this invention is to improve the workability of cementitious compositions by incorporating therein chemical additive which also improves bleeding characteristics and the like.

Other objects and further scope of applicability of the present invention will become apparent from the detailed description given hereinafter.

The chemical admixture of the instant invention consists of the product resulting from the intimate mixing at atmospheric conditions of suitable nitrogen base and alkyl aryl polyoxyalkene ethers, alcohols and mixtures thereof wherein the weight percentage ratio of the latter to the former is betwen 0.5 and about 4.0.

The alkyl aryl polyoxyalkene portion may be considered to be of the general formula:

or

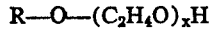

where R represents an alkyl aryl portion consisting of a benzene ring with at least one alkyl group, having 4 to 18 carbon atoms substituted thereon. A multiplicity of polyalkene units, that is, the degree of polymerization, is indicated by x, being of the order of about 6 to about 30.

Suitable nitrogen bases which are combined with the alkyl aryl polyoxyalkene portion include mono- and poly-aliphatic, aralkyl, carbocyclic and heterocyclic amines whether of primary, secondary or tertiary character; also the alkylolamines, whether mono- or monosubstituted or poly- or polysubstituted.

In the preparation of the products, the ingredients were mixed at room temperature and atmospheric pressure to effect intimate contact. Combination of the ingredients consisted of combining one or a mixture of several alkyl aryl polyoxyalkene ethers and alcohols with one or a mixture of nitrogen bases. Chemical analysis has not shown whether the product obtained is necessarily a true chemical reaction product, although there is a slight exothermic reaction during mixing, and accordingly the product is believed to consist of both reaction products and reactants. It is, however, not desirable to limit the invention by any theory as to the specifics of any reaction.

For the preparation of the invention admixtures, alkyl aryl polyalkene glycols, ethers and alcohols are preferred, which have 4 to 18 carbon atoms in the alkyl group, the aryl portion comprising a benzene ring or a substituted benzene ring with a multiplicity of polyalkene units of 6 to 30 molecules per alkyl aryl portion. Such alkyl aryl polyalkene glycols, ethers and alcohols are exemplified by nonyl and octyl phenol polyethylene and polypropylene glycols, ethers and alcohols. Polyethylene ethers of lauryl alcohol and of 1,1,3,3,-tetra *methylbutyl* phenol are also illustrative. Mannitan and sorbitan esters of higher fatty acids and condensation products therefrom with polyalkene derivatives and the like are useful.

Suitable nitrogen bases which are combined with the alkyl aryl polyalkene glycols, ethers and alcohols to result in the desired admixtures comprise, for example: ammonia, the mono- or poly-aliphatic, aralkyl, carbocyclic and heterocyclic amines, whether of primary, secondary or tertiary characters, as diisopropyl amine, methyl ethyl amine, trimethyl amine, the hexyl and/or cetyl amines, diethyl aniline, diethylbenzilamine, cyclohexylamine, 2-amino-pyridine, ethylene diamine, phenylene diamine, benzidene, etc.; amides, as acetamide, the mixed amides of vegetable and animal oils, fats and waxes, as those of coconut oil, sardine oil, castor oil, soya bean oil, etc., acetanilide, benzamide, urea, and the like, and cyclic nitrogen bases as pyrrole, indole, pyridine, quinoline, piperidine, pyrazole, naphthoquinoline, the azines, whether di-, tri-, ox- or thiazines. The saturated or unsaturated homologues, analogues and substitution products (e.g., containing halogen, hydroxyl and/or other substituents) of the above compounds, such as, for example, the alkylolamines, whether mono-substituted or poly-substituted, as mono-methanolamine, diethanol amine, triethanolamine, triisopropanolamine, N-ethanol amine, mono- or di-ethanol ethylene diamine, etc., may also be used, as well as quaternary ammonium bases.

The amount of this type of admixture required to produce the various degrees of enhancement of concrete properties lies in the general range of 0.03 and 0.3%, expressed as a percent by weight of the hydraulic cementitious binder material, e.g., Portland cement. As stated above, the weight percentage ratio of alkyl aryl polyalkene glycol ether or alcohol to nitrogen base used to prepare the type of admixtures of this invention varies between about 0.5 and about 4.0. The amount or dosage used in treating a cementitious mix is dependent on the actual concentration of the chemical reactants in a particular formulation; for example, admixture F, below, will give optimum performance in the general dosage range of 0.070% when 100 parts of F consist of 12 parts of nonylphenol polypropylene glycol ether, 8 parts of diethanolamine and 80 parts of water. The dosage can thus be varied depending on the dilution. In other words, admixture F will also perform satisfactorily in a cementitious mix at a dosage of 0.035% when 100 parts of F are composed of 24 parts of nonylphenolpolypropylene glycol ether, 16 parts of diethanolamine and 60 parts of water. Such amount or dosage is somewhat dependent on the characteristics of the particular materials employed in the making of the hydraulic cementitious mixture.

The admixture, being a water-soluble liquid, may be added to either the mixing water, the aggregates, or directly into the mixer containing the proportioned cement and aggregates.

This invention is not to be restricted to an admixture consisting of only one particular polyoxyalkene or substituted polyoxyalkene portion with various nitrogen bases nor is it to be confined to an admixture consisting of only one particular nitrogen base with various polyoxyalkene or substituted polyoxyalkene portions.

Whereas many commercial water-reducing admixtures require the incorporation of an air-entraining agent into the formulation, this invention performs its functions, including that of air-entrainment, without the incorporation of an air-entraining agent or air-entraining component. Air-entraining agents, per se, do not permit maintenance or enhancement of strength without increase in cement content, necessitating uneconomical redesign of mix. This invention, however, a water-reducing admixture with air-entraining ability is, by virtue of its unique surface activity, in a cementitious mix, capable of enhancing all principal properties of product in both the plastic and hardened state at reductions in cement content.

Admixtures for such purposes as regulation of setting and hardening time, cement dispersion, water repellency, bonding and others can be used in conjunction with this invention by addition to the mix prior or subsequent to the addition of the latter.

A more complete understanding of the invention may be obtained by reference to the following examples of operations within the scope of this invention. In these examples all parts and percentages are by weight unless otherwise indicated.

*Example I*

Sixty parts by weight of nonylphenolpolyethylene glycol ether (9.5 polyethylene units) were added at room conditions to 40 parts by weight of triethanolamine in the presence of a variable amount of water, the latter assisting in promoting intimate contact. The resulting product was suitable as a chemical admixture for the purpose of the invention. This product is hereinafter referred to as product "A."

*Example II*

The admixture was prepared as in Example I, but the formulating proportions were 71 parts of nonylphenolpolyethylene glycol ether (9.5 polyethylene units) and 29 parts of triethanolamine. This product is hereinafter referred to as product "B."

*Example III*

The admixture was prepared as in Example I, but the formulating proportions were 33 parts of nonylphenolpolyethylene glycol ether (9.5 polyethylene units) and 67 parts of triethanolamine. This product is hereinafter referred to as product "C."

*Example IV*

The admixture was prepared as in Example I, but the formulating proportions were 75 parts of nonylphenolpolyethylene glycol ether (9.5 polyethylene units) and 25 parts of triethanolamine. This product is hereinafter referred to as product "D."

*Example V*

The admixture was prepared as in Example I, but the formulating proportions were 50 parts of nonylphenolpolyethylene glycol ether (9.5 polyethylene units) and 50 parts of triethanolamine. This product is hereinafter referred to as product "E."

Water-reduction characteristics or maintenance of consistency, as measured by slump, at reduced water contents are important for various reasons as discussed above. Although the effects of such water reductions are exhibited in the hardened products, it is in the plastic state that the chemical admixtures of this invention affect consistency. For the purpose of illustrating water-reduction characteristics and the effect of the chemical admixtures relating to this invention, on consistency, data regarding Examples I to V (products A–E) are set forth in Table 1 below.

It can be seen that a decided decrease in consistency of increase in fluidity, as measured by slump, has been brought about by use of the various admixtures at equal water content (mixes 3, 5, 7, 9 and 11). In order to maintain the slump equal to that of the untreated mix, a significant reduction in water content was necessitated for each treated mix (mixes 2, 4, 6, 8 and 10). Such a water reduction is a significant step in the right direction toward the enhancement of concrete properties.

TABLE 1

Tests on concrete proportioned 1:2.1:2.8 by weight.
Natural sand, fineness modulus 2.90.
Cement Factor, nominal 6 sacks per cu. yd.
ASTM Type I Portland cement.
River gravel, maximum size ¾ in.

| Mix No. | Admixture | Dosage, percent by wt. cement | Water Content | | Slump, in. | Air Content, Percent |
|---|---|---|---|---|---|---|
| | | | Pound | Percent | | |
| 1 | None | | 333 | 100 | 3.5 | 1.5 |
| 2 | A | 0.142 | 284 | 86 | 3.5 | 4.7 |
| 3 | A | 0.142 | 333 | 100 | 6.5 | 4.2 |
| 4 | B | 0.093 | 277 | 84 | 3.5 | 4.3 |
| 5 | B | 0.093 | 333 | 100 | 7.25 | 4.0 |
| 6 | C | 0.065 | 300 | 91 | 3.5 | 4.0 |
| 7 | C | 0.065 | 333 | 100 | 5.5 | 4.4 |
| 8 | D | 0.182 | 280 | 85 | 3.5 | 5.0 |
| 9 | D | 0.182 | 333 | 100 | 7.0 | 4.2 |
| 10 | E | 0.210 | 290 | 88 | 3.5 | 4.0 |
| 11 | E | 0.210 | 333 | 100 | 5.75 | 4.2 |

The data of Table 2 illustrate the effect of the chemical admixture of this invention on the bleeding characteristics of typical concrete mixes.

It can be seen that the incorporation of the chemical admixtures of this invention causes a considerable reduction in bleeding. This reduction in bleeding is most significant when proper advantage is taken of the use of the admixture by maintaining consistency by means of water reduction.

The bleeding of mixes treated with the instant composition is decidedly less than that of the other mixes of comparable mix proportions. It is also noteworthy that lesser quantities of bled water are involved at the time of cessation of bleeding. Air-entrainment generally is conducive to reduced rates of bleeding and, although in the data of Table 2, air-entrainment is involved, a specific effect of this invention as an accelerator of bleeding is exhibited.

TABLE 2

Tests on concrete proportioned 1:2.1:2.8 by weight.
Natural sand, fineness modulus 2.90.
Cement Factor, nominal 6 sacks per cu. yd.

ASTM Type I Portland cement.
River gravel, maximum size ¾ in.
Water Contents and Slumps as shown in Table 1.

| Mix No. | Admixture | Dosage, percent by wt. cement | Water, ml. | | | | | Bleeding percent | Bleeding as percent of untreated mix |
|---|---|---|---|---|---|---|---|---|---|
| | | | Total in Specimen | 1 hr. | 2 hr. | 3 hr. | Total Bled | | |
| 1 | None | | 2,790 | 37 | 78 | 103 | 106 | 3.8 | 100 |
| 2 | A | 0.142 | 2,540 | 22 | 44 | 56 | 56 | 2.2 | 58 |
| 3 | A | 0.142 | 2,730 | 31 | 65 | 83 | 84 | 3.1 | 82 |
| 4 | B | 0.093 | 2,480 | 23 | 43 | 58 | 60 | 2.4 | 63 |
| 5 | B | 0.093 | 2,760 | 30 | 62 | 78 | 79 | 2.9 | 76 |
| 6 | C | 0.065 | 2,680 | 20 | 41 | 60 | 62 | 2.4 | 63 |
| 7 | C | 0.065 | 2,780 | 40 | 75 | 84 | 88 | 3.2 | 84 |
| 8 | D | 0.182 | 2,500 | 22 | 36 | 59 | 60 | 2.4 | 63 |
| 9 | D | 0.182 | 2,740 | 34 | 61 | 78 | 80 | 3.4 | 90 |
| 10 | E | 0.210 | 2,590 | 21 | 39 | 66 | 68 | 2.6 | 68 |
| 11 | E | 0.210 | 2,695 | 33 | 65 | 85 | 87 | 3.2 | 84 |

Although finishing time may be decreased by offsetting retardation through the use of an inorganic salt-type accelerator such as calcium chloride, the use of such has often been found to be detrimental to cementitious bond with reinforcing steel and pre-stressing wire because of corrosion effects, to cause excessive shrinkage, and to aggravate the reaction between the alkali component of cement and potentially reactive aggregate. The present invention is of such composition and performance characteristics as to obviate generally the necessity for use of inorganic accelerators. Table 3 is illustrative of this.

TABLE 3.—SETTING TIME OF MORTARS AT 73° F.

Proportions by wt., 1 cement: 3 sand.
W/C by wt., 0.56.
ASTM type I cement.

| Mix No. | Admixture | Dosage, percent by wt. cement | Setting Time, Hrs. | |
|---|---|---|---|---|
| | | | Initial | Final |
| 12 | None | | 4.7 | 6.7 |
| 13 | A | 0.142 | 4.3 | 6.2 |
| 14 | B | 0.093 | 4.5 | 6.8 |
| 15 | C | 0.065 | 4.8 | 7.1 |
| 16 | D | 0.182 | 4.7 | 7.0 |
| 17 | E | 0.210 | 4.8 | 6.9 |

At low ambient temperatures, such as those of late fall and early spring, the rates of chemical reactions responsible for setting of concrete are notoriously slow. At such temperatures the present invention exhibits the ability to accelerate setting reactions as shown in Table 4.

TABLE 4.—SETTING TIME OF MORTARS AT 50° F.

Proportions by wt., 1 cement: 3 sand.
W/C by wt., 0.56.
ASTM type I cement.

| Mix No. | Admixture | Dosage, percent by wt. cement | Setting Time, Hrs. | |
|---|---|---|---|---|
| | | | Initial | Final |
| 18 | None | | 7.7 | 15.4 |
| 19 | A | 0.042 | 6.6 | 12.0 |
| 20 | B | 0.093 | 6.9 | 12.7 |
| 21 | C | 0.065 | 7.0 | 13.0 |
| 22 | D | 0.182 | 6.8 | 12.1 |
| 23 | E | 0.210 | 6.9 | 12.4 |

Compressive strength is the most generally accepted criterion of good concrete, and, although such acceptance can be misleading, it is, nevertheless, true that compressive strength and other quality characteristics are related. The strength of a concrete will generally increase with the proportion of cement in the mix until the strength of the cement paste or aggregate, whichever is the weaker, is reached. Just as important as the cement content is the water content of a mix. Inasmuch as strength is inversely proportional to the water-cement ratio, and, unfortunately, workability requirements necessitate two or three times the water required for chemical hydration of the cement, it is logical to use a means of reducing the water content while maintaining equal or improved workability. The water-reduction as can be obtained by this invention is effective in promoting greater strength when it is supplementary to that derived from air-entrainment alone. Table 5 presents test data illustrating this fact.

In the Table 5 it is evident that whereas admixtures A and D of this invention cause air-entrainment comparable in amount to that by the air-entraining agent, the strength properties are significantly different. Admixtures A and D show considerable strength enhancement at a cement reduction of about 13%. This benefit is due to supplementary water-reduction and the specific chemical effect of the invention which goes beyond that of the well-known water-cement ratio-strength relationship.

TABLE 5

Tests on concrete proportioned 1:2.3:3.3 by weight.
Natural sand, fineness modulus 2.90.
Slump, 5½ in.

ASTM Type II cement.
River gravel, maximum size ¾ in.

| Mix No. | Admixture | Dosage, percent by wt. cement | Cement, lb. | Water, lb. | Air, percent | Compressive Strength of 3 x 6 in. cylinders, standard cured, avg. of three p.s.i. | | |
|---|---|---|---|---|---|---|---|---|
| | | | | | | 1 day | 7 days | 28 days |
| 24 | None | | 575 | 349 | 1.4 | 795 | 2,420 | 3,990 |
| 25 | Air-entraining agent. | 0.444 | 575 | 329 | 4.5 | 750 | 2,330 | 3,740 |
| 26 | A | 0.142 | 500 | 316 | 4.6 | 810 | 2,540 | 4,110 |
| 27 | D | 0.182 | 500 | 310 | 4.4 | 790 | 2,660 | 4,220 |

Additional examples of suitable admixtures were made in accordance with the previously described procedure, wherein different alkyl aryl polyalkene glycols, ethers, or alcohols were intimately mixed with suitable nitrogen bases and given in the following examples.

Example VI

The admixture was prepared as in Example I, but the formulation consisted of 60 parts of nonylphenolpolypropylene glycol ether (6 moles propylene oxide) and 40 parts of diethanolamine. This product is hereinafter referred to as product "F."

Example VII

The admixture was prepared as in Example I, but the formulation consisted of 75 parts of octylphenol polyethylene glycol ether (11 moles ethylene oxide) and 25 parts of triethanolamine. This product is hereinafter referred to as product "G."

Example VIII

The admixture was prepared as in Example I, but the formulation consisted of 50 parts of dodecylphenol polyethylene glycol ether (22 moles ethylene oxide) and 50 parts of phenylenediamine. This product is hereinafter referred to as product "H."

Example IX

The admixture was prepared as in Example I, but the formulation consisted of 80 parts of nonylphenol polybutylene glycol alcohol (9 moles butylene oxide) and 20 parts of trimethylamine. This product is hereinafter referred to as product "I."

Example X

The admixture was prepared as in Example I, but the formulation consisted of 30 parts of decylphenol polypropylene glycol ether and 70 parts of pyridine. This product is hereinafter referred to as product "J."

Table 6 presents test data illustrating the performance of concrete treated with admixtures described in Examples VI to X.

TABLE 6

Tests on concrete proportioned 1:2.5:3.0 by weight. ASTM Type I cement.
Natural sand, fineness modulus 2.78. Crushed limestone, maximum size 1 in.
Slump, 2½–3 in. Cement Factor, nominal 6 sacks per cu. yd.

| Admixture | Dosage, percent | Strength at 28 days, p.s.i. | | Air Content, percent | Initial Set, hrs. | Bleeding, percent |
|---|---|---|---|---|---|---|
| | | Compressive | Flexural | | | |
| None | | 3,860 | 620 | 1.3 | 5.2 | 5.2 |
| F | 0.070 | 3,990 | 670 | 4.8 | 5.1 | 2.9 |
| G | 0.140 | 4,130 | 710 | 4.6 | 5.2 | 4.1 |
| H | 0.125 | 4,240 | 710 | 4.7 | 4.9 | 3.2 |
| I | 0.220 | 4,070 | 700 | 5.4 | 5.0 | 4.5 |
| J | 0.085 | 3,890 | 660 | 4.9 | 4.8 | 3.4 |

It is believed the above provides a complete description of the invention in such manner as to distinguish it from other inventions and from what is old, and provides a description of the best mode contemplated of carrying out the invention and thereby complies with the patent statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein, but only in accordance with the appended claims, when read in the light of the foregoing description.

What I claim is:

1. A cement composition comprising an hydraulic cement and from about 0.03 to about 0.3 percent, based on the weight of said hydraulic cement, of a water-reducing admixture; said admixture consisting essentially of the product resulting from the intimate mixing at room temperature and atmospheric pressure of (1) a nitrogen base with (2) about 0.5 to about 4.0 parts per part of said nitrogen base by weight of an alkyl aryl polyoxyethylene ether wherein the alkyl aryl moiety is a benzene ring substituted by at least one alkyl group of 4 to 18 carbon atoms and the number of oxyethylene units in the molecule is from about 6 to about 30.

2. The composition of claim 1 wherein said nitrogen base is an aliphatic amine.

3. The composition of claim 1 wherein said nitrogen base is an alkylolamine.

4. The composition of claim 1 wherein said nitrogen base is phenylenediamine.

5. The composition of claim 1 wherein said nitrogen base is trimethylamine.

6. The composition of claim 1 wherein said nitrogen base is triethanolamine.

7. The compostion of claim 1 wherein said alkyl aryl polyoxyethylene ether is the ethylene oxide adduct of nonyl phenol.

8. The compostion of claim 1 wherein said alkyl aryl polyoxyethylene ether is the ethylene oxide adduct of dodecyl phenol.

9. The composition of claim 1 wherein said hydraulic cement is Portland cement.

10. A method of treating a cement composition comprising an hydraulic cement to reduce the water-cement ratio required for effecting a desired workability which comprises adding to said cement composition from about 0.03 to about 0.3 percent, based on the weight of said hydraulic cement, of a water-reducing admixture consisting essentially of the product resulting from the intimate mixing at room temperature and atmospheric pressure of (1) a nitrogen base with (2) about 0.5 to about 4.0 parts per part of said nitrogen base by weight of an alkyl aryl polyoxyethylene ether wherein the alkyl aryl moiety is a benzene ring substituted by at least one alkyl group of 4 to 18 carbon atoms and the number of oxyethylene units in the molecule is from about 6 to about 30.

11. The method of claim 10 wherein said nitrogen base is an aliphatic amine.

12. The method of claim 10 wherein said nitrogen base is an alkylolamine.

13. The method of claim 10 wherein said nitrogen base is phenylenediamine.

14. The method of claim 10 wherein said nitrogen base is trimethylamine.

15. The method of claim 10 wherein said nitrogen base is triethanolamine.

16. The method of claim 10 wherein said alkyl aryl polyoxyethylene ether is the ethylene oxide adduct of nonyl phenol.

17. The method of claim 10 wherein said alkyl aryl polyoxyethylene ether is the ethylene oxide adduct of dodecyl phenol.

18. The method of claim 10 wherein said hydraulic cement is Portland cement.

References Cited by the Examiner

UNITED STATES PATENTS

| | | | |
|---|---|---|---|
| 2,231,502 | 2/1941 | Krzikalla et al. | 260—297 |
| 2,860,160 | 11/1958 | Sandberg et al. | 106—90 |
| 2,965,678 | 12/1960 | Sandberg et al. | 106—90 |
| 2,979,528 | 4/1961 | Lundsted | 260—584 |
| 3,008,843 | 11/1961 | Jolly | 106—90 |
| 3,090,692 | 5/1963 | Kelly et al. | 106—315 |
| 3,097,179 | 7/1963 | Ceintrey | 260—584 |

FOREIGN PATENTS 799,071  7/1958  Great Britain.

TOBIAS E. LEVOW, *Primary Examiner.*

S. E. MOTT, *Assistant Examiner.*